United States Patent [19]

Storck et al.

[11] 4,036,460
[45] July 19, 1977

[54] DEVICE FOR DEPENDENTLY SUPPORTING AN OBJECT

[75] Inventors: Friedrich Storck, Rodenberg; Rudolf Kunesch; Gernot Missbach, both of Munich, all of Germany

[73] Assignee: Hilti Aktiengesellschaft, Schaan, Liechtenstein

[21] Appl. No.: 608,687

[22] Filed: Aug. 28, 1975

[30] Foreign Application Priority Data

Sept. 2, 1974  Germany .................. 7429525[U]

[51] Int. Cl.² ............................................. E21F 17/02
[52] U.S. Cl. .................................... 248/59; 248/327; 403/393; 403/396
[58] Field of Search ............................... 248/59–64, 248/410, 317, 320–323, 327, 328; 403/393, 396, 397

[56] References Cited

U.S. PATENT DOCUMENTS

| 457,797 | 8/1891 | Shilling | 403/393 |
|---|---|---|---|
| 545,774 | 9/1895 | Clark | 248/59 |
| 2,304,973 | 12/1942 | Vecchiola | 248/58 |
| 2,696,674 | 12/1954 | Tilghman | 403/393 X |
| 2,768,804 | 10/1956 | Keller | 248/59 |
| 2,893,766 | 7/1959 | Meyer | 403/396 |
| 2,971,355 | 2/1961 | Walsh | 403/393 X |
| 3,377,038 | 4/1968 | Loudon | 248/59 |
| 3,415,473 | 12/1968 | Ollen | 248/59 |

FOREIGN PATENT DOCUMENTS

| 1,272,648 | 7/1968 | Germany | 248/59 |
|---|---|---|---|
| 2,007,922 | 8/1971 | Germany | 248/59 |

Primary Examiner—Lawrence J. Staab
Attorney, Agent, or Firm—Toren, McGeady and Stanger

[57] ABSTRACT

For dependently supporting an object, such as from a ceiling or overhead support, a pair of elongated support elements are locked into a clamp strap. An upper one of the support elements extends upwardly from the clamp strap for attachment to the overhead support while the other support element extends downwardly from the clamp strap with the object to be supported attached to its lower end. The upper and lower support elements are co-extensive for a portion of their lengths. The co-extensive portions of the support elements are contiguous to one another. The clamp strap has a pair of legs with at least one slot in each leg extending in the direction of the leg. The co-extensive portions of the support elements pass through and are held within the slots in the clamp strap. The slots have a shape generally conforming to at least a part of the transverse cross-sectional shape of the support element.

8 Claims, 5 Drawing Figures

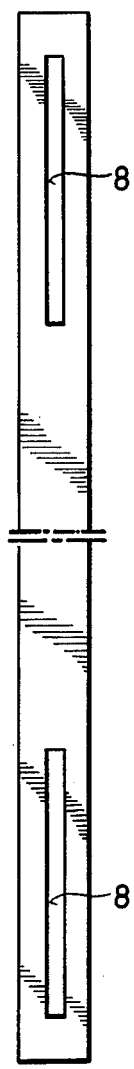
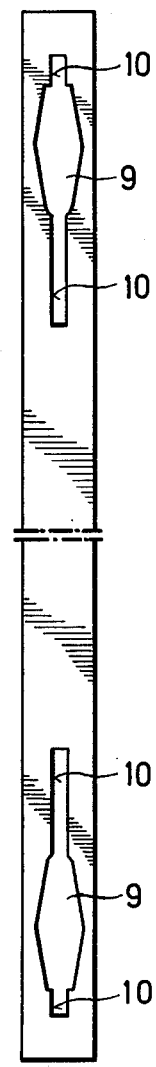
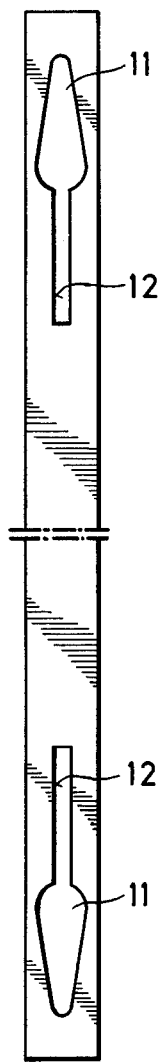
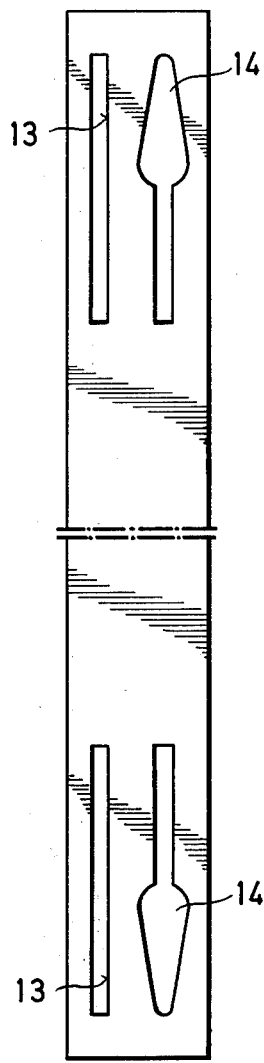

DEVICE FOR DEPENDENTLY SUPPORTING AN OBJECT

SUMMARY OF THE INVENTION

The present invention is directed to a device for dependently supporting an object and includes an upper support element, a lower suport element and a clamp strap locking the support elements together. The clamp strap has a pair of legs with cut-outs or slots formed in the legs into which the support elements are locked.

In hanging false ceilings, rod shaped support elements are used one connected to the permanent ceiling and the other connected to the false ceiling spaced below the permanent ceiling. The ends of the rods extend through common openings in the legs of a carrying strap. The ends of the rods extending through the strap are contiguous to each other and are mutually locked in the common opening so that a variable height adjustment can be obtained.

Because of the rods used in such known devices, there is the disadvantage that special wall screws are necessary for attaching the rods to the permanent ceiling and to the false or dropped ceiling. As a result, the range of application of such hanging devices is greatly limited. For example, the rods cannot be used for hanging simple objects such as pipes, conduits and the like about which the rod must be wrapped, because they form no anchorage for the necessary screws.

Therefore, it is the primary object of the present invention to provide a device for dependently supporting objects which makes it possible to support objects that are troublesome in providing a suitable attachment between the object and the support elements.

In accordance with the present invention, at least one of the support elements can be band-shaped.

The band-shaped arrangement of one or both of the support elements offers an extremely large variety of attachments of the support elements to a ceiling or other overhead support and also to the object to be supported. In particular, it is possible to encircle the object to be supported by the support elements. Various combinations of support elements can be used, for instance, one of the upper and lower support elements or both of the support elements may be band-shaped.

The term "band-shaped" is not intended to be taken in the strict literal sense. What is meant by this term is that the support element is a shaped member which needs to be stiff or rigid in one direction only.

Where only band-shaped support elements are used, the cut-outs or slots in the clamp strap are preferably in the form of elongated straps extending substantially parallel to the longitudinal direction of the legs of the strap. While the width of the slots corresponds to the thickness of the band-shaped supports, the length of the slots is dimensioned in accordance with the width of the support elements, that is, the dimension extending transversely to the elongated direction of the support elements. Accordingly, any desired band-shaped material can be used by properly selecting the slot dimensions in the clamp strap.

Alternatively, the cut-outs or slots in the clamp strap can be shaped more or less elliptically with at least one slot-shaped extension extending from the elliptically shaped portion for receiving a band-shaped member with the extension extending in the elongated direction of the clamp strap legs.

Accordingly, a clamp strap with slots partly elliptically shaped and partly arranged to receive a band-shaped member, can be used to lock support elements of different shapes. The elliptically shaped portion of the slot can be used to hold a rod while a band-shaped support member can be held within the extension of the slot from the elliptically shaped portion. The term "elliptical" is meant in a broad or general sense and is not to be limited to something which is exactly geometrically elliptical. For example, the elliptical portion of the cut-out or slots can have a more or less rhomboidal appearance with portions of the elliptically shaped cut-out being conveniently rounded. The important feature of such a design is that it is possible to fit rods of different diameters in the same slot. Another advantage of such a slot is that narrow extensions suitable to receive a band-shaped member can be provided from either end of the elliptically shaped portion of the cut-out in the clamp strap leg. Accordingly, a band-shaped member can be positioned into one of the extensions in combination with a rod located in the elliptical portion, depending on the width of the band-shaped member.

To increase the diameter range of rods usable as support elements, it has proved advantageous to make the cut-out or slots in the clamp strap legs drop-shaped with at least one extension running from the drop-shaped portion which is configured to receive and hold a band-shaped member. Both the drop-shaped portion and the extension extends in the elongated direction of the clamp strap legs. With this arrangement there is the advantage that the range of diameters of the rod shaped support elements can be considerably increased.

Another feature of the invention is that each of the legs of the clamp strap can be provided with a plurality of cut-outs or slots spaced from one another. Such slots can incorporate any of the shapes mentioned above. With a plurality of slots in each of the legs there is the increased possibility in the combination of shapes of support elements which can be used with a single clamp strap.

To obtain good spring properties in the clamp strap it is preferable if the strap is V-shaped. Such a shape is easy and inexpensive to manufacture.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive material in which there are illustrated and described preferred embodiments of the invention.

BRIEF DESCRIPTION OF THE DRAWING

In the drawing:

FIG. 2 is one embodiment of a clamp strap usable in the device shown in FIG. 1;

FIG. 3 is another embodiment of a clamp strap usable in the device shown in FIG. 1;

FIG. 4 is yet another arrangement of a clamp strap which can be employed in the device shown in FIG. 1; and FIG. 5 is a further clamp strap combining features of several of the clamp straps illustrated which can be utilized in the device shown in FIG. 1.

DETAIL DESCRIPTION OF THE INVENTION

Figure 1:
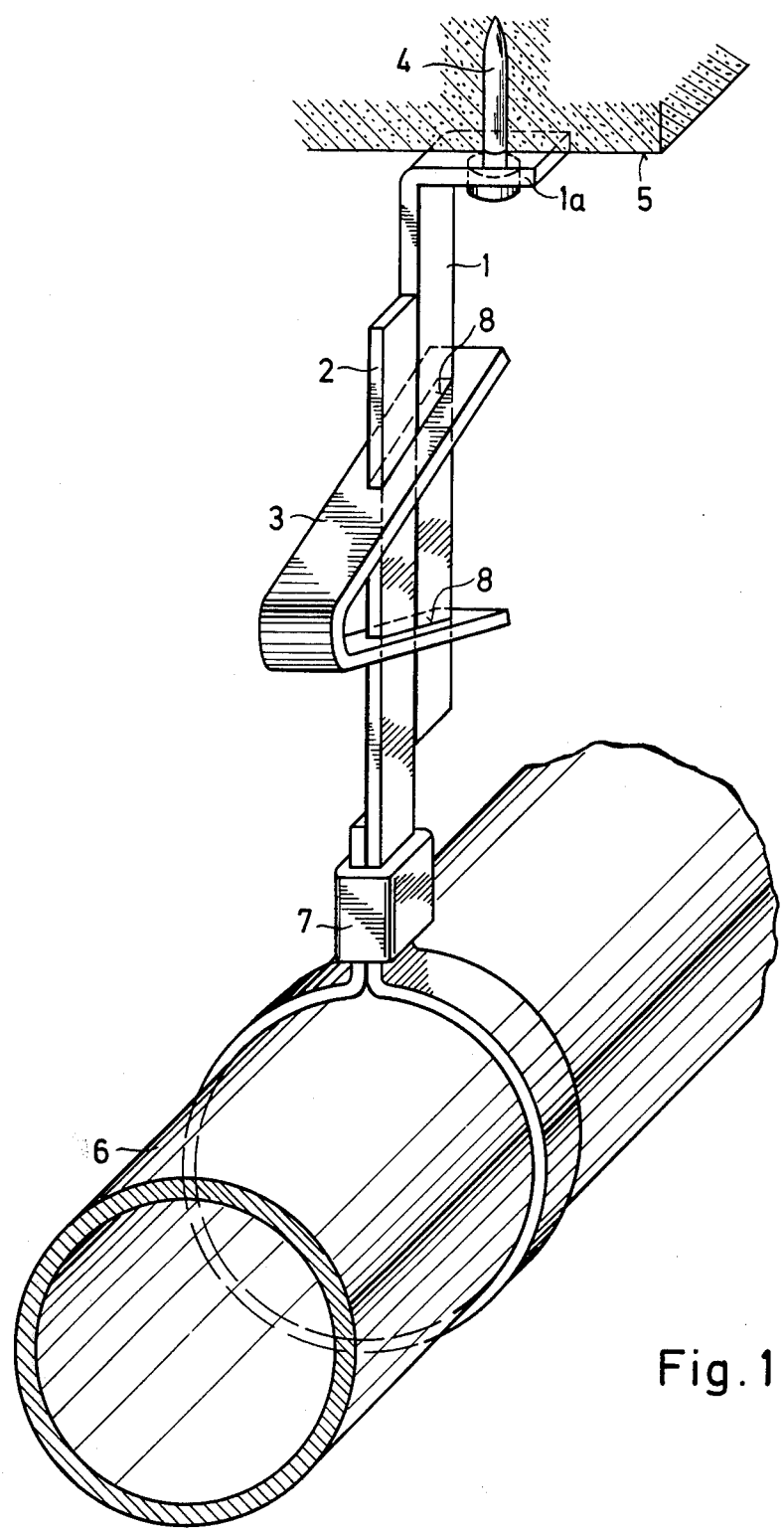
FIG. 1 is a side view, partly in section, of a device, for dependently supporting an object, embodying the present invention.

In FIG. 1 a device is shown for dependently supporting an object from an overhead support. The device consists essentially of an upper support element 1, a lower support element 2 and a clamp strap 3 securing the two support elements together. In FIG. 1 both the upper support element 1 and the lower support element 2 are formed of a band-shaped material. The overhead support is a ceiling 5 and the upper end of the upper support element 1 is secured to the ceiling by a commercial fastening element 4, such as a nail, with the fastening element passing through a bent-over end 1a of the support element 1. The lower end of the lower support element 2 encircles a pipe 6 which is the dependently supported object. By means of a clasp 7 of a conventional type, the free end of the lower support element is secured to the remaining part of the element. Clasps 7 are widely known and need not be further described.

As can be seen in FIG. 1, a lower part of upper support element 1 and an upper part of lower support element 2 are coextensive and disposed in contiguous relation and pass through a common opening or slot in each of the legs of the generally V-shaped clamp strap 3. The overlapping lateral edges of the upper support element 1 and the lower support element 2 are in contact with one another and the resilience of the clamp strap and the load applied onto the support device are such so that the clamp strap locks the two support elements together.

In FIGS. 2-5 various blanks are shown which form the clamp straps, in other words, the basic form of the strap is provided with cut-outs or slots according to the type of support elements to be used, however, the strap has not yet been bent into its operative shape.

In FIG. 2, a blank for a clamp strap is shown which is suitable to receive band-shaped support elements, such as shown in FIG. 1, which extend through the elongated slots 8. As can be appreciated, when the blank is bent to form the clamp strap the slots 8 are aligned opposite one another so that the support elements can extend through them. The length and width of the slots 8 depend on the cross-sectional dimensions of the particular band-shaped material used as the support elements.

In FIG. 3, a clamp strap blank is shown which can be used with both band-shaped and rod-shaped support elements. The cut-outs or slots in the blank extend in the elongated direction of the blank or in the elongated direction of the legs which are formed when the blank is bent into its operative shape. A portion of the length of the slots have an elliptical shape 9 with a narrow rectilinear extension 10 projecting from each of the opposite ends of the elliptically shaped portion. By providing different dimensions for the rectilinear extensions or portions 10 of the slots, as shown in FIG. 3, it is possible to use different widths of band-shaped material within the same slot. Depending on its width, the band-shaped material is introduced into the portion of the rectilinear extension of the slot which has the respective length.

While the elliptically shaped portions 9 of the slots in the blanks shown in FIG. 3 permit a certain variation in the diameter range of the rods which can be used for support elements, the blank displayed in FIG. 4 is particularly intended for use with rod-shaped support elements of different diameters. Accordingly, the cut-outs of slots have a drop-shaped portion 11 with a rectilinear extension 12 extending from the wider end of the drop-shaped portion.

In FIG. 5, a clamp strap blank is shown with a combination of slot shapes. The combination illustrated is exemplary only and a variety of other shapes could also be used. In each half of the blank and extending in the longitudinal direction of the blank are a pair of slots, 13 and 14, the slots 13 have a configuration corresponding to that of band-shaped support elements while the slots 14 are configured to receive both band-shaped and rod-shaped support elements. The configuration of the cut-outs is selected in accordance with the shape of the support elements to be used. Further, the number of slots in the blank can be varied depending on the type of support required.

While specific embodiments of the invention have been shown and described in detail to illustrate the application of the inventive principles, it will be understood that the invention may be embodied otherwise without departing from such principles.

What is claimed is:

1. A support device for dependently supporting an object comprising a first elongated support element, a second elongated support element, and a clamp strap disposed in locking engagement with said first and second support elements, said clamp strap having a first leg and a second leg, each of said first leg and second leg having at least one slot therein, said first and second support elements having an overlapping portion extending in the elongated direction of said first and second support elements and disposed in contiguous relation with the overlapping portion of the other of said first and second support elements, each of the overlapping portions of said first and second support elements extending through one of said slots in each of said first and second legs of said clamp strap and being held in locking engagement with the other said support element within the slots by said clamp strap, each of said legs of said clamp strap being elongated and said at least one slot in each said leg extending in the elongated direction of the leg, wherein the improvement comprises that at least one of said first and second support elements is band-shaped and flat and has a rectangularly shaped transverse cross section, at least a portion of said slots in each said leg of said clamp strap in which said band-shaped support element is positioned has the same rectangularly shaped transverse cross section as said band-shaped support element for receiving said band-shaped support element in form-fitted engagement and the rectangularly shaped transverse cross section of said band-shaped support element having a longer dimension and a short dimension with the longer dimension extending in the elongated direction of the leg of said clamp strap and being greater than the shorter dimension of said band-shaped element extending transversely so that said band-shaped element is rigid in the direction of the longer dimension of the transverse cross section thereof.

2. A support device, as set forth in claim 1, wherein said legs of said clamp strap are disposed angularly apart.

3. A support device, as set forth in claim 2, wherein said clamp strap is V-shape with said legs of said clamp strap each forming one of the legs of the V-shaped.

4. A support device, as set forth in claim 2, wherein the legs of said clamp strap extend transversely of the elongated direction of said support elements.

5. A support device, as set forth in claim 4, wherein means are provided in engagement with said first elongated support element at a position spaced from said overlapping portion thereof for attaching said first elongated support element to an overhead support and means mounted on said second elongated support element for securing an object to be supported to said second elongated support element.

6. A support device for dependently supporting an object comprising a first elongated support element, a second elongated support element, and a clamp strap disposed in locking engagement with said first and second support elements, said clamp strap having a first leg and a second leg, each of said first leg and second leg having at least one slot therein, said first and second support elements each having an overlapping portion extending in the elongated direction of said first and second support elements and disposed in contiguous relation with the overlapping portion of the other of said first and second support elements, each of the overlapping portions of said first and second support elements extending through one of said slots in each of said first and second legs of said clamp strap and being held in locking engagement with the other said support element within the slots by said clamp strap, each of said legs of said clamp strap being elongated and said at least one slot in each said leg extending in the elongated direction of the leg, wherein the improvement comprises that at least one of said first and second support elements is band-shaped and flat and has a rectangularly shaped transverse section, at least a portion of said slots in each leg of said clamp strap in which said band-shaped support element is positioned has the same rectangularly shaped transverse cross section as said band-shaped support element for receiving said band-shaped support element in form-fitted engagement, at least another portion of said at least one slot in each said leg of said clamp strap being elliptical in the plane of said leg with said elliptical portion being contiguous to and extending in the elongated direction of said leg from said portion having the rectangularly shaped cross section.

7. A support device for dependently supporting an object comprising a first elongated support element, a second elongated support element, and a clamp strap disposed in locking engagement with said first and second support elements, said clamp strap having a first leg and a second leg, each of said first leg and second leg having at least one slot therein, said first and second support elements each having an overlapping portion extending in the elongated direction of said first and second support elements and disposed in contiguous relation with the overlapping portion of the other of the said first and second support elements, each of the overlapping portions of said first and second support elements extending through one of said slots in each of said first and second legs of said clamp strap and being held in locking engagement with the other said support element within the slots by said clamp strap, each of said legs of said clamp strap being elongated and said at least one slot in each said leg extending in the elongated direction of the leg, wherein the improvement comprises that at least one of said first and second support elements is band-shaped and flat and has a rectangularly shaped transverse section, at least a portion of said slots in each leg of said clamp strap in which said band-shaped support element is positioned has the same rectangularly shaped transverse cross section as said band-shaped support element for receiving said band-shaped support element in form-fitted engagement, and at least another portion of said at least one slot in each said leg of said clamp strap being drop-shaped in the plane of said leg with said drop-shaped portion being contiguous to and extending in the elongated direction of said leg from said portion having the rectangularly shaped cross section.

8. A support device for dependently supporting an object comprising a first elongated support element, a second elongated support element, and a clamp strap disposed in locking engagement with said first and second support elements, said clamp strap having a first leg and a second leg, each of said first leg and second leg having at least one slot therein, said first and second support elements each having an overlapping portion extending in the elongated direction of said first and second support elements and disposed in contiguous relation with the overlapping portion of the other of said first and second support elements, each of the overlapping portions of said first and second support elements extending through one of said slots in each of said first and second legs of said clamp strap and being held in locking engagement with the other said support element within the slots by said clamp strap, each of said legs of said clamp strap being elongated and said at least one slot in each said leg extending in the elongated direction of the leg, wherein the improvement comprises that at least one of said first and second support elements is band-shaped and flat and has a rectangularly shaped transverse section, at least a portion of said slots in each leg of said clamp strap in which said band-shaped support element is positioned has the same rectangularly shaped transverse cross section as said band-shaped support element for receiving said band-shaped support element in form-fitted engagement, and each of said legs of said clamp strap having at least two slots therein each extending in the elongated direction of said leg.

* * * * *